United States Patent
Olson

(10) Patent No.: US 8,832,639 B2
(45) Date of Patent: Sep. 9, 2014

(54) METHOD AND SYSTEM FOR COMPARATIVE COMMUNITY BASED ANALYTICS

(75) Inventor: Todd Adam Olson, Raleigh, NC (US)

(73) Assignee: Rally Software, Boulder, CO (US)

( * ) Notice: Subject to any disclaimer, the term of this patent is extended or adjusted under 35 U.S.C. 154(b) by 1348 days.

(21) Appl. No.: 11/634,579

(22) Filed: Dec. 6, 2006

(65) Prior Publication Data

US 2008/0141214 A1 Jun. 12, 2008

(51) Int. Cl.
*G06F 9/44* (2006.01)
*G06Q 10/06* (2012.01)

(52) U.S. Cl.
CPC ..................................... *G06Q 10/06* (2013.01)
USPC ....................................................... 717/101

(58) Field of Classification Search
CPC ..................................... G06F 8/70; G06F 8/77
USPC ....................................................... 717/101
See application file for complete search history.

(56) References Cited

U.S. PATENT DOCUMENTS

| | | | |
|---|---|---|---|
| 5,930,798 A | 7/1999 | Lawler et al. | |
| 6,519,763 B1 | 2/2003 | Kaufer | |
| 6,671,871 B2 | 12/2003 | Utsumi | |
| 6,721,941 B1 * | 4/2004 | Morshed et al. | 717/127 |
| 6,748,582 B1 | 6/2004 | Chiles et al. | |
| 6,873,961 B1 | 3/2005 | Thorpe et al. | |
| 6,944,606 B2 | 9/2005 | Schmit et al. | |
| 7,305,392 B1 * | 12/2007 | Abrams et al. | 707/770 |
| 7,698,248 B2 * | 4/2010 | Olson | 706/56 |
| 7,954,090 B1 * | 5/2011 | Qureshi et al. | 717/127 |
| 2004/0015823 A1 * | 1/2004 | Nolan | 717/104 |
| 2004/0068490 A1 * | 4/2004 | Guibord et al. | 707/3 |
| 2004/0093584 A1 * | 5/2004 | Le | 717/103 |
| 2005/0132014 A1 | 6/2005 | Horvitz et al. | |
| 2005/0289503 A1 | 12/2005 | Clifford | |
| 2006/0123389 A1 * | 6/2006 | Kolawa et al. | 717/101 |

OTHER PUBLICATIONS

Philip M. Johnson, A continuous, evidence-based approacch to discovery and assessment of software engineering best practices, 2005, Department of Information & Computer Sciences University of Hawaii.*

Philip M, Johnson, "A continuous, evidence-based approach to discovery and assessment of software engineering best practices", 2005.*

Philip M. Johnson, "A continuous, evidence-based approach to discovery and assessment of software engineering best practices", 2005.*

* cited by examiner

*Primary Examiner* — Li B Zhen
*Assistant Examiner* — Lenin Paulino
(74) *Attorney, Agent, or Firm* — Triangle Patents PLLC

(57) ABSTRACT

The present invention provides for tracking time spent on various activities in a software development project by one or more users working on the project. The present invention also stores this data to derive metrics and best practices. The metrics and best practices are compared with project data to analyze the current status of the project and to estimate the completion timeframe for the current project.

21 Claims, 3 Drawing Sheets

METHOD AND SYSTEM FOR COMPARATIVE COMMUNITY BASED ANALYTICS

BACKGROUND OF THE INVENTION

1. Field of the Invention

The present invention relates generally to analytics for software development. Further, the present invention relates to gathering data and comparing it with best practices to establish status of a project and corrective actions.

2. Description of the Prior Art

The software development lifecycle is complex. It comprises multiple phases that are carried out sequentially or in parallel. These phases require teams of individuals that are often located in different physical locations to co-ordinate with each other in an efficient manner to complete all the activities in a given time. Estimating the time required for the software development phases is a harrowing task that all project managers have difficulty coping with.

It is even more difficult is to estimate the amount of time spent on a particular task in a particular phase of a software development project. This is because team members often work on multiple software development projects simultaneously. It is important to have an accurate estimate of the time spent on a project by all team members in order to accurately estimate the time remaining and the completion date of the project. It also helps in providing managers with knowledge about the current status of the project, and if the project is proceeding as planned.

Project managers estimate time spent on a project by requesting the team members to fill out weekly or daily timesheets. The team members fill these time sheets from memory, and hence these do not provide an accurate estimate of the time spent on the various activities of a project. This in turn leads to an inaccurate picture about the current status of a project. Without a clear picture about the current status of a project, it becomes even more difficult to predict the completion date for a project and adhere to it.

It is also difficult to estimate the performance of teams with such inaccurate data. One measure of performance is comparison of the team's performance with industry wide best practices. Since the best practices are computed by collecting performance data, which is inaccurate to begin with, from multiple sources, the comparison will also not yield an accurate picture of the state of the current processes.

There are numerous solutions in the prior art addressed towards this problem. One such example is U.S. Pat. No. 6,519,763 titled "Time Management and Task Completion and Management Software" assigned to Compuware Corporation. This patent describes an apparatus for ascertaining project completion and managing a project with high efficiency and accuracy. It comprises of data collectors that automatically gather data that is generated by various tools, such as scheduling, defect tracking, and other software management and quality tools. The data is analyzed to generate statistical measures relating to the status of the project. The data collectors collect data from project management software, defect reports and testing reports and other sources that provide information about the project status.

Another such solution is described in US Patent Application Pub. No. 20050289503 titled "System for Identifying Project Status and Velocity through Predictive Measures" by Clifford, Gregory. This patent application describes a method for providing visibility into the real time progress and status of software development projects by collecting measures from software development tools about the progress of the project, examining data sources created during the progress of the project and evaluating the collected data by using expert reasoning system based on causal modeling to arrive at project velocity views. The system collects data from sources such as configuration management systems, defect management systems, project management system and source code.

Although the prior art tried to address the problem of estimating project completion and project status accurately, it fails to address the need for a system that compares project status information with best practices in the industry. Further, the prior art does not describe a way in which project completion information from various companies' offices can be stored to generate best practices without compromising the security of the data. Additionally, the prior art does not describe a way in which data is collected from various software development tools and using that data to estimate project completion and real time status. Collecting data from software development tools provides insights into the software development process and one can compare the time a person spends on various tools for completing a given task. This provides insight into a deeper level that the prior art, in general, does not provide.

From the above discussion, it is clear that there is a need for a system that will collect data from tools used for software development, but will also collect data across organizations and store the data in such a way that privacy of the organizations is not compromised. Further, the system should be able to generate best practices from the collected data and to provide comparisons about current trends of a software project with the industry best practices.

SUMMARY OF THE INVENTION

A first aspect of the present invention is to provide best practices data relating to a software development lifecycle for a first subscriber, the first subscriber having at least one user participating in the software development lifecycle, the at least one user employing at least one tool for the software development lifecycle, the method including the steps of collecting data from the at least one tool, storing the data along with data collected from at least one second subscriber, the data relating to at least one software development lifecycle for the at least one second subscriber, deriving best practices from stored data, and displaying the best practices along with a comparison of the best practices with the data collected from the first subscriber.

A second aspect of the present invention is to provide best practices data relating to a software development lifecycle for a first subscriber, the first subscriber having at least one user participating in the software development lifecycle, the at least one user employing at least one tool for the software development lifecycle, the system including at least one client computer having at least one monitor module, the monitor module collecting data from the at least one tool used by the at least one user for the software development lifecycle, the data collected relating to the usage of the at least one tool, at least one aggregator module for collecting data from the at least one monitor module, at least one server for storing data, the server collecting data from the at least one aggregator module, and a data presentation module for deriving best practices data from the stored data and for presenting the best practices data to at least one subscriber.

A third aspect of the present invention is to provide best practices data relating to a knowledge based project for a first subscriber, the first subscriber having at least one user participating in the knowledge based project, the at least one user employing at least one tool for the knowledge based project, the method including the steps of collecting data from the at least one tool, storing the data along with data collected from at least one second subscriber, the data relating to at least one knowledge based project for the at least one second subscriber, deriving best practices from stored data, and displaying the best practices along with a comparison of the best practices with the data collected from the first subscriber.

These and other aspects of the present invention will become apparent to those skilled in the art after a reading of the following description of the preferred embodiment when considered with the drawings, as they support the claimed invention.

DETAILED DESCRIPTION

Figure 1:
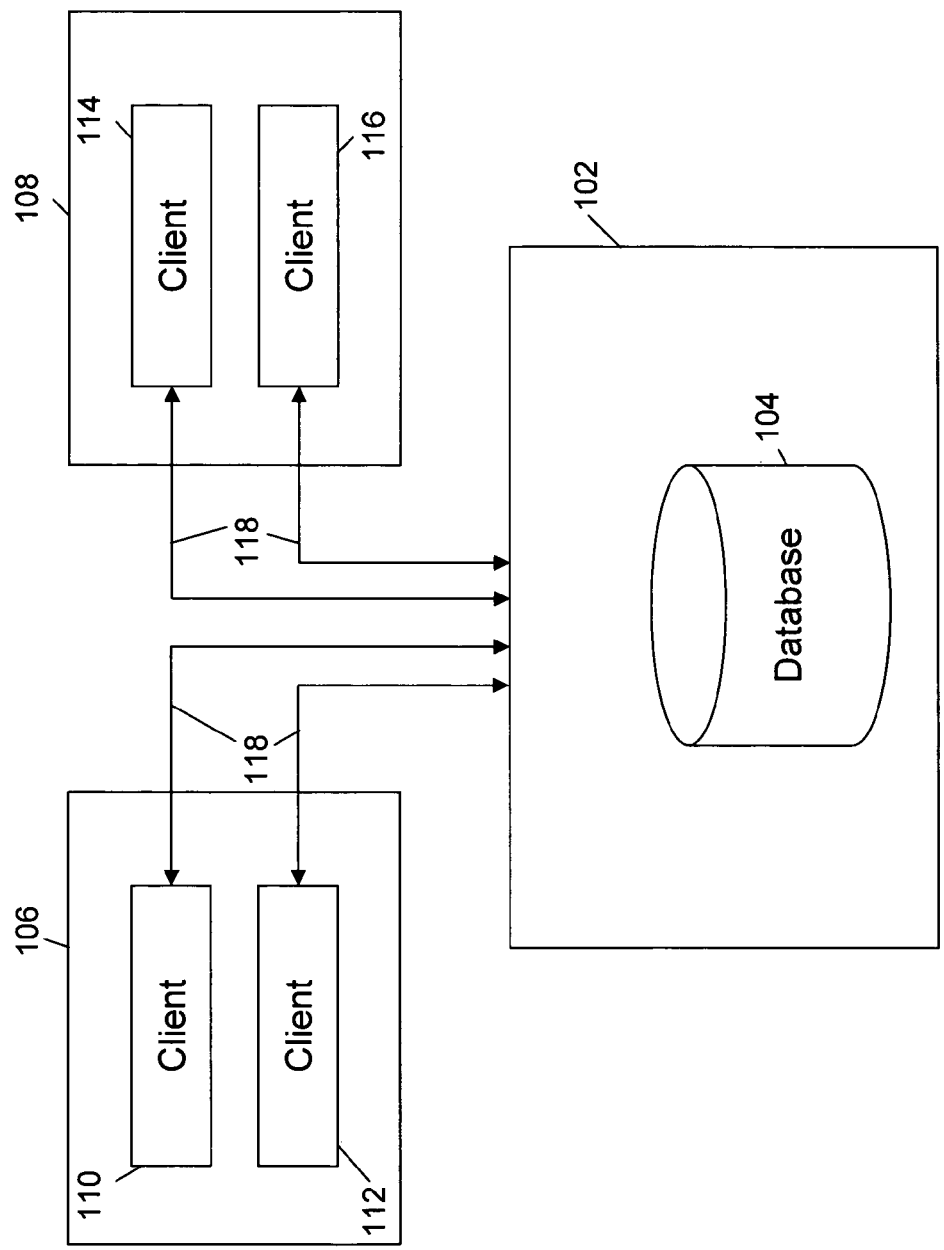
FIG. 1 is a schematic of the overall system, in accordance with an embodiment of the present invention.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

The present invention provides for tracking time spent on various activities in a software development project by one or more users working on the project. The present invention also stores this data to derive metrics and best practices. The metrics and best practices are compared with project data to analyze the current status of the project and to estimate the completion timeframe for the current project.

In an embodiment, data is collected from multiple applications or tools that are used in the software development lifecycle. This data is then transferred to a database at a central location. Data is collected from multiple users in multiple organizations and stored in the database. This data can then be aggregated to form best practices. These best practices can be overall, based on organization size, location, specialization, or any other attribute related to organizations, and/or based on project phase, project tasks, or any other project related attribute. The best practices indicate the total time it should take to complete a project and/or the time it should take to complete a portion or a step of a project. These best practices show the timeline of a project and the important tasks and phases that should be completed. Based on the best practices and phases or tasks completed, a user can estimate the current status of the project and a completion data for the project.

Referring now to the drawings in general, the illustrations are for the purpose of describing a preferred embodiment of the invention and are not intended to limit the invention thereto. FIG. 1 is a schematic of the overall system, in accordance with an embodiment of the present invention. The system comprises server 102. Server 102 comprises database 104. The system also comprises subscribers 106 and 108. Subscribers 106 and 108 are organizations that have access to connect to server 102. In an embodiment, subscribers 106 and 108 are individuals, software development communities, organizations, companies, divisions or departments of entities, etc. Subscriber 106 comprises client 110 and client 112. Similarly, subscriber 108 comprises client 114 and client 116. Clients 110, 112, 114 and 116 are personal computers, laptops, PDA's, mobile devices, tablet PC's or any other device with computational ability. Client 110 and 112 belong to subscriber 106 or are operated by users who are affiliated with subscriber 106. Similarly, client 114 and 116 belong to subscriber 108 or are operated by users who are affiliated with subscriber 108. In other embodiments, a large number of subscribers can be present in the system. Similarly, in other embodiments, the number of clients per subscriber can vary in number. Clients 110, 112, 114, and 116 are connected to server 102 via network 118. An example of network 118 is the internet. In other embodiments, network 118 can be a local area network, wide area network, wireless network, or other means of communication between a server and a client known in the art. In an embodiment, database 104 is separate from server 102 and is connected to server 102 via a network or other means known in the art.

Figure 2:
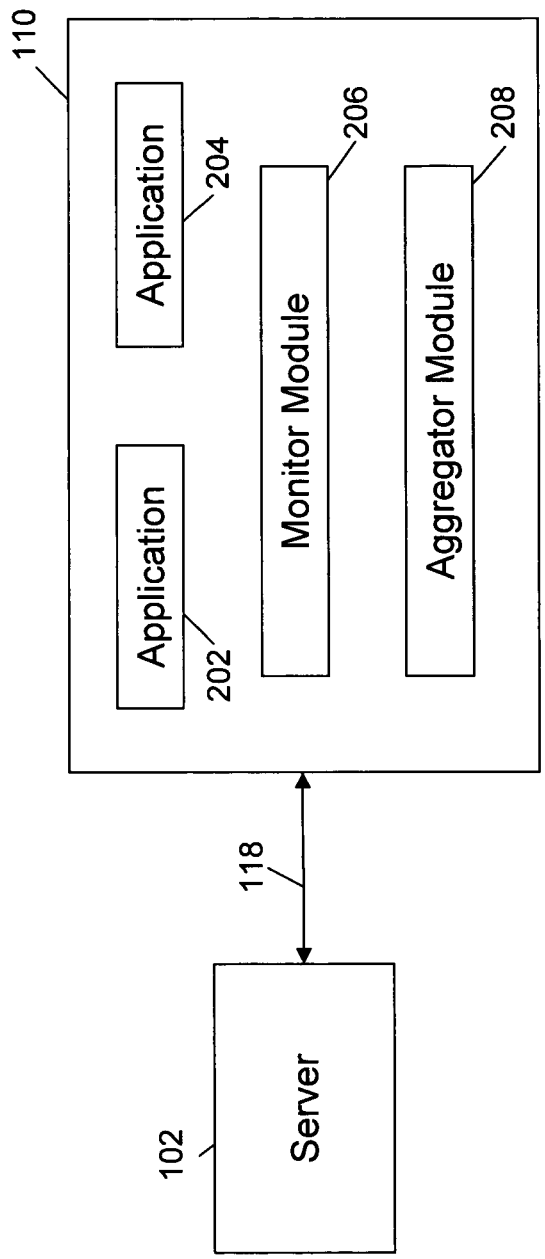
FIG. 2 is a schematic of a system depicting data collection, in accordance with an embodiment of the present invention.

FIG. 2 is a schematic of a system depicting data collection, in accordance with an embodiment of the present invention. Client 110 comprises application 202, application 204, monitor module 206 and aggregator module 208. Applications 202 and 204 are software applications that can be executed on client 110 and are used in the software development lifecycle. Examples of applications 202 and 204 are software development languages and environments such as MS Visual Studio, Borland JBuilder, Eclipse, GNU Emacs, VIM, Idea IntelliJ and others. Applications 202 and 204 can also include software testing tools such as Mercury QuickTestPro, Mercury Winrunner and Segue SILK, bug tracking tools such as Bugzilla, Atlassian Jira, IBM/Rational Clearquest, code repositories such as CVS and MS SourceSafe and any other software product that is used for the software development lifecycle. Monitor Module 206 monitors the activity of client 110 and records time spent using applications 202 and 204. This information is passed on to aggregator module 208 by monitor module 206. In an embodiment, monitor module constantly monitors the activity of applications 202 and 204 and any other software, service, process, web server, database server that may be running on client 110. Aggregator module 208 collects data sent by monitor module 206 and transmits the data to server 102. In an embodiment, aggregator module 208 communicates the data at predetermined intervals. In another embodiment, aggregator module 208 communicates the data at a predefined time of the day, week or month. In another embodiment, aggregator module 208 communicates data when connection between itself and server 102 is made available. In an embodiment, aggregator module 208 does not reside on client 110, but at a central location such that aggregator module 208 can communicate with monitor module 206 for multiple clients.

Aggregator module 208 sends data collected from monitor module 206 to server 102 via network 118. In addition to sending the data, aggregator module also sends information that can uniquely identify client 110, subscriber 106 to which client 110 belongs, or combinations thereof. The data contains information such as application name, time spent, username, date time and information about activities such as edit file, open file, save file, build started, build ended, debug and design edit. Please note that this list is meant to serve as an example and other type of data can be collected by monitor module 206. Server 102 receives the data along with fields that identify the client, the subscriber, or combinations thereof sending the data and stores it in database 104.

Figure 3:
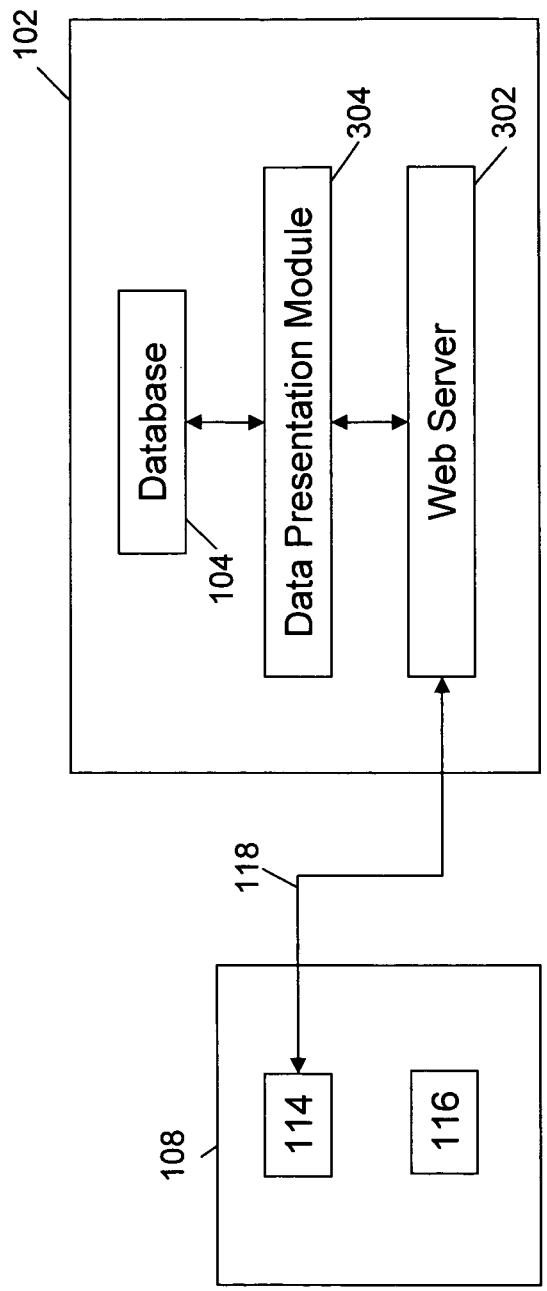
FIG. 3 is a schematic of a system depicting data presentation, in accordance with an embodiment of the present invention.

Monitor module 206 are based on the Hackystat open-source project sponsored by the University of Hawaii. Monitor modules 206 use architecture common to the Hackystat sensor architecture to collect usage information from applications 202 and 204 on client computer 110. More information on Hackystat is available on their project website, http://www.hackystat.org. Monitor module 206 interacts with applications 202 and 204 at the API level to capture events that are user-initiated. These events correspond to one of many predefined activity types that can be collected by aggregator module 208. The aggregator module collects and sends this data FIG. 3 is a schematic of a system depicting data and best practices presentation, in accordance with an embodiment of the present invention. Server 102 comprises web server 302 and data presentation module 304. Client 114 sends a request to web server 302 via network 118 to view best practice data. Web server 302 forwards the request along with data identifying the subscriber to which client 114 belong to data presentation module 304. Data presentation module retrieves project data stored in database 104 and generates best practices from the data. In one embodiment, best practices are generated by aggregating data that is stored in database 104.

In generating the best practices, data presentation module 304 selects data on the basis of the request sent by client 114. In an embodiment, client 114 may request to view best practices of subscribers that are similar to the subscriber 108, on the basis of size, number of people, type of product developed, revenue or other parameters. In another embodiment, client 114 requests to view best practices on the basis of type of project, number of people required for project, completion time of project, programming language or environment of the project, or any other attribute of the project. Data presentation module 304 retrieves data from database 104 on the basis of the type of request from client 114. Data presentation module also retrieves data stored in database 104 for subscriber 108, client 114 or combinations thereof. This data is presented along with the best practices to client 114 for comparison purposes. The data representing the best practices does not provide information relating to where the data is collected from to client 114. This protects privacy of subscribers of the system, such that other subscribers cannot identify data from other subscribers, but are only presented with aggregated data from multiple subscribers.

In an embodiment of the present invention, client 114 is provided with an alert module that constantly compares the progress of the current project with best practices and alerts a user if there is a deviation or if the deviation is more than a predetermined value.

In one embodiment, the system provides for tracking time spent on various activities in a knowledge based activity or project by one or more users working on the project. The present invention also stores this data to derive metrics and best practices. The metrics and best practices are compared with project data to analyze the current status of the project and to estimate the completion timeframe for the current project. Examples of knowledge based activities or projects include research projects, business consulting projects, and other project types that require users to work on software tools on a computer. In this embodiment, monitor module 206 tracks time spent on the various tools and reports this data to aggregator module 206. Best practices are generated from the stored data based on the project type, knowledge based activity, project sector or other parameters.

Certain modifications and improvements will occur to those skilled in the art upon a reading of the foregoing description. By way of example, the scope of the present invention is not limited to the software tools mentioned as examples in this text. Also, other types of projects can be tracked by this system. Additionally, the present invention can function with only one organization as a subscriber. In this case, departments or divisions of that single entity can function as multiple subscribers. Data from these divisions can be aggregated to form community based data. All modifications and improvements have been deleted herein for the sake of conciseness and readability but are properly within the scope of the following claims. The above mentioned examples are provided to serve a purpose of clarifying the aspects of the invention and it will be apparent to one skilled in the art that they do not serve to limit the scope of the invention.

What is claimed is:

1. A method for providing best practices data relating to a software development lifecycle for multiple subscriber companies with multiple users wherein at least one of the multiple subscribers is a first subscriber with at least one user participating in the software development lifecycle, the multiple users employing at least one tool for code development for the software development lifecycle, the method comprising the steps of:
   a. continuously collecting a multiplicity of sets of data relating to the use of the at least one tool for code development from the multiple users in the multiple subscriber companies, wherein the data relates to at least one software development lifecycle and includes subscriber company attributes, including company size, location, specialization and revenue, and wherein the data further includes project attributes, including project type, phase, tasks, number of people required, completion time, programming language, and environment;
   b. storing and periodically updating the multiple sets of data along with at least one second set of data continuously collected from at least one second subscriber company to form an aggregated set of data, the at least one second set of data relating to at least one software development lifecycle for the at least one second subscriber company, and periodically comparing updated data sets;
   c. periodically deriving multi-company best practices from the aggregated set of data;
   d. alerting the user when deviating from best practices;
   e. displaying the best practices along with a comparison of the best practices with the first set of data, wherein the displayed best practices include the total time it should take to complete the project, the time it should take to complete a portion of the project, and the timeline of a project and the important tasks and phases; and
   f. estimating the current status of the project and a completion date for the project.

2. The method of claim 1, wherein the data is collected regarding activities such as coding, testing, bug fixing and other activities in a software development lifecycle.

3. The method of claim 1, further comprising the step of collecting data from at least one tool for code development used by at least one second user belonging to the first subscriber company.

4. The method of claim 1, wherein the first subscriber company cannot view information collected from another subscriber company except for best practices.

5. The method of claim 1, wherein the first subscriber company can view information collected from the at least one user of the first subscriber company.

6. The method of claim 1, wherein the data is collected unobtrusively from the at least one tool.

7. The method of claim 1, wherein the periodicity of the database updating is selected from the group consisting of daily, weekly and monthly.

8. The method of claim 1, wherein the best practices are derived by analyzing the aggregated set of data.

9. The method of claim 8, wherein the best practices are derived from a subset of the aggregated set of data, the subset of data selected on the basis of data relating to a stage in the software development lifecycle, the stage comprising design, development and implementation.

10. The method of claim 8, wherein the best practices are derived from a subset of the aggregated set of data, the subset of data selected on the basis of data relating to an activity in the software development lifecycle, the activity comprising coding, testing and bug fixing.

11. The method of claim 8, wherein the best practices are derived from a subset of the aggregated set of data, the subset of data selected on the basis of data relating to an attribute of the first subscriber company, the attribute comprising but not limited to size of subscriber, location of subscriber, primary activity of subscriber, number of employees of subscriber.

12. A system for providing best practices data relating to a software development lifecycle for multiple companies with multiple users participating in the software development lifecycle, the multiple users employing at least one tool for code development for the software development lifecycle, the system comprising:
   a. multiple client computers having monitor modules, the monitor modules continuously collecting data from the at least one tool for code development used by the multiple users for the software development lifecycle, the data collected relating to the usage of the at least one tool;
   b. at least one aggregator module for collecting data from the monitor modules;
   c. at least one server for storing data, the server periodically collecting data from the aggregator modules and comparing the data;
   d. a data presentation module for periodically deriving best practices data from the stored data and for presenting the best practices data to at least one subscriber;
   e. at least one alert module that constantly compares the progress of the current project with best practices and alerts a user if there is a deviation or if the deviation is more than a predetermined value;
   f. wherein the data is related to at least one software development lifecycle and includes subscriber company attributes, including company size, location, specialization and revenue, and wherein the data further includes project attributes, including project type, phase, tasks, number of people required, completion time, programming language and environment; and
   g. wherein the displayed best practices include the total time it should take to complete the project, the time it should take to complete a portion of the project, and the timeline of a project and the important tasks and phases.

13. The system of claim 12, wherein the aggregator module resides on the client computer on which the monitor module resides.

14. The system of claim 12, wherein the aggregator module resides on a second server that communicates with the first server and communicates with the monitor module.

15. The system of claim 12, wherein the data presentation module presents the best practices data to a first subscriber company, the best practices data including data collected from the first subscriber company and a second subscriber company.

16. The system of claim 15, wherein the data presentation module prevents the first subscriber company from viewing information collected from the second subscriber company, except the best practices data.

17. A method for providing best practices data relating to a knowledge based project for multiple subscribing companies, each having at least one user participating in the knowledge based project, the at least one user employing at least one tool for code development for the knowledge based project, the method comprising the steps of:
   a. collecting a first set of data from a first subscribing company using the at least one tool for code development, wherein the data is related to at least one software development lifecycle and includes subscriber company attributes, including company size, location, specialization and revenue, and wherein the data further includes project attributes, including project type, phase, tasks, number of people required, completion time, programming language, and environment;
   b. storing and periodically updating the first set of data along with at least one second set of data collected from at least one second subscribing company to from a periodically-updated aggregated set of data, the at least one second set of data relating to at least one knowledge based project for the at least one second subscribing company;
   c. comparing the periodically-updated data sets and periodically deriving best practices from the aggregated set of data;
   d. alerting the user when deviating from best practices;
   e. displaying the best practices along with a comparison of the best practices with the first set of data, wherein the displayed best practices include the total time it should take to complete the project, the time it should take to complete a portion of the project, and the timeline of a project and the important tasks and phases; and
   f. estimating the current status of the project and a completion date for the project.

18. The method of claim 17, wherein the first subscriber company cannot view information collected from another subscriber except for the best practices.

19. The method of claim 17, wherein the first subscriber company can view information collected from the at least one user of the first subscriber company.

20. The method of claim 17, wherein the data is updated periodically and the periodicity is daily, monthly or yearly.

21. The method of claim 17, wherein the best practices are derived by analyzing a subset of the aggregated set of data.

* * * * *